United States Patent [19]

Wagner

[11] 4,370,829

[45] Feb. 1, 1983

[54] SELF-ALIGNING VEHICLE DOOR HINGES

[75] Inventor: Robert J. Wagner, Milwaukee, Wis.

[73] Assignee: Allis-Chalmers Corporation, Milwaukee, Wis.

[21] Appl. No.: 193,602

[22] Filed: Oct. 3, 1980

[51] Int. Cl.³ .............................................. E05D 7/08
[52] U.S. Cl. ...................................... 49/388; 296/146
[58] Field of Search .......................... 49/388; 296/146

[56] References Cited

U.S. PATENT DOCUMENTS

| 2,923,036 | 2/1960 | Beyrle | 49/388 |
| 3,059,271 | 10/1962 | Erickson | 49/388 X |
| 3,331,159 | 7/1967 | Cooke et al. | 49/388 X |
| 3,404,486 | 10/1968 | Kellerhals | 16/224 X |

Primary Examiner—Kenneth Downey
Attorney, Agent, or Firm—Arthur L. Nelson

[57] ABSTRACT

A self-aligning door hinge having a pin and sleeve bearing and a spherical bushing and socket bearing to minimize the effect of any misalignment of the hinges and simplify door assembly.

7 Claims, 8 Drawing Figures

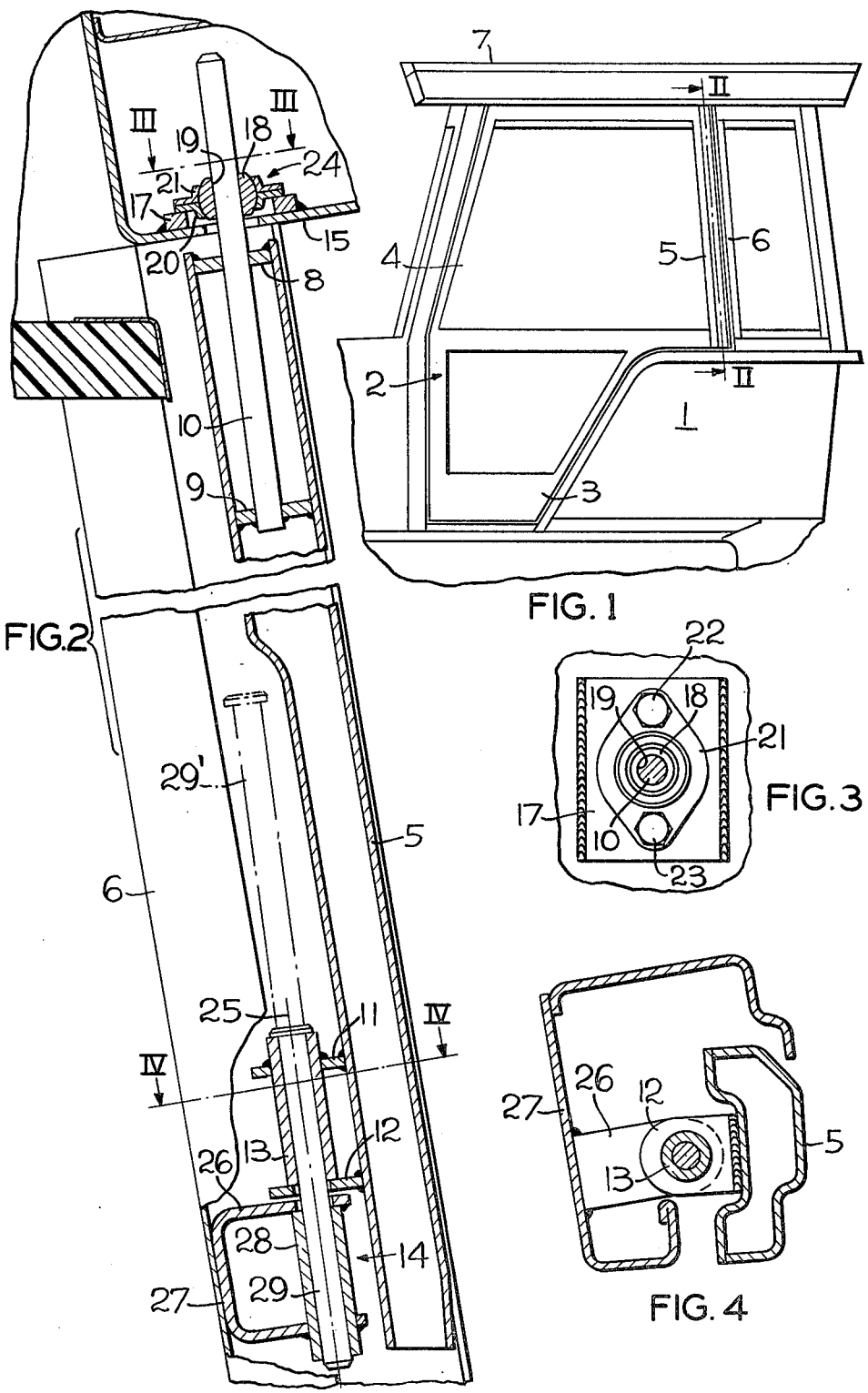

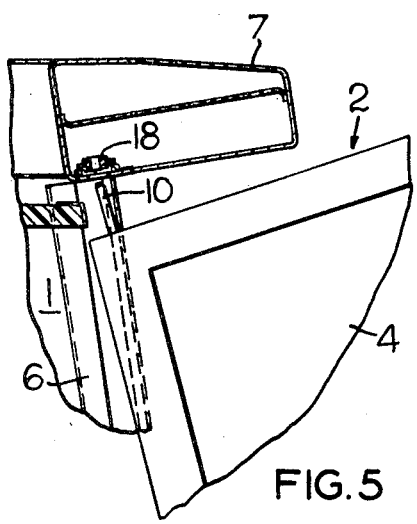
FIG.5
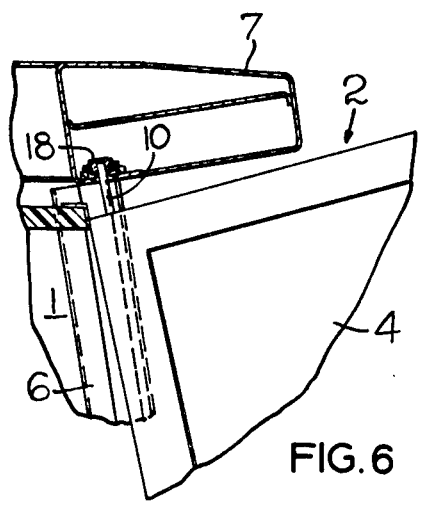
FIG.6
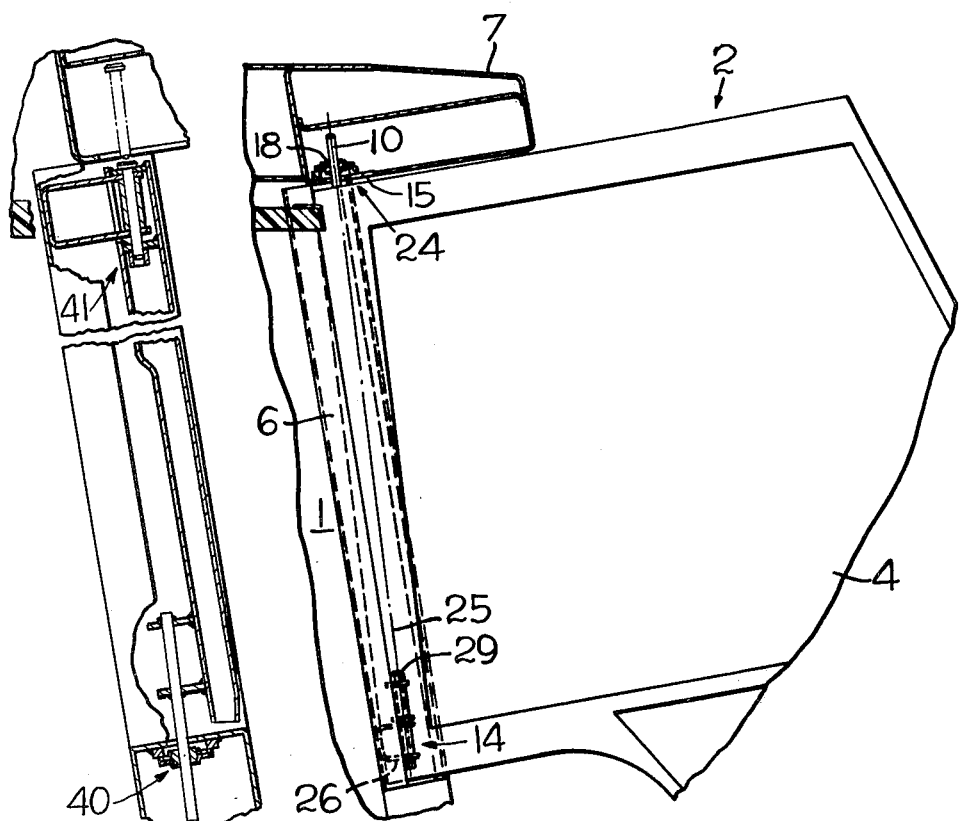
FIG.8
FIG.7

SELF-ALIGNING VEHICLE DOOR HINGES

This invention relates to hinges and more particularly to a self-aligning pin and bushing hinge with a spherical bushing and socket hinge to compensate for any misalignment of the door hinges.

Door hinges normally are mounted on the door frame and support the door in at least two place. Hinges normally lie essentially on a common axis to allow the door to swing freely. The doors on a vehicle cab are designed for reasonably close tolerances, but due to the use of sheet metal and during the process of fabrication variations affecting the alignment of the hinges occur. Since it is difficult to always have perfect alignment and economically not feasible to maintain close tolerances, applicant's invention provides for an alternative. One hinge utilizes a spherical bushing seated in a socket to allow universal movement of the bushing within the socket. The spherical bushing may be on the upper or lower hinge. The bushing embraces a shaft on one-end of the door, while the other end of the door is supported by a pivotal pin and bushing hinge. Any misalignment is compensated for through the spherical bushing.

U.S. Pat. No. 3,874,027 and U.S. Pat. No. 4,162,097 illustrate hinges used on doors and a vehicle cab similar to that used on the conventional tractor. The devices in these patents, however, do not use the spherical bushing and socket to accommodate minor misalignment of the hinges on the cab door as set forth in the applicant's invention.

It is an object of this invention to provide door hinges in which one of the hinges pivots about a pin while the second hinge includes a spherical bushing mounted in a socket to accommodate any misalignment between the two hinges.

It is another object of this invention in which one hinge pivots on a pin while the second hinge pivots through a spherical bushing to accommodate for any misalignment of the hinges and also to facilitate assembly.

The objects of this invention are accomplished by providing a door with a shaft extending above the door panel to be received within a cylindrical opening in the center of a spherical bushing. The spherical bushing is mounted in a socket to provide universal movement of the upper door hinge. The lower door hinge is connected by inserting a pin in a bushing permitting a pivotal movement of the door relative to the door frame.

The hinges permit ease in assembling and mounting of the door by initially inserting the shaft into the spherical bushing and pressing it upwardly until the upper door is aligned and swinging the lower door to align the lower hinge and position the pin in the lower hinge assembly.

Referring to the drawings, the preferred embodiment of this invention is illustrated.

FIG. 1 illustrates a side elevation view of a vehicle cab;

FIG. 2 is a cross-section view taken on line II—II of FIG. 1 showing the two hinges assembled;

FIG. 3 is a cross-section view taken on line III—III of FIG. 2 showing the upper hinge assembly;

FIG. 4 is a cross-section view taken on line IV—IV of FIG. 2 showing the lower hinge;

FIGS. 5, 6, and 7 are cross-section views similar to FIG. 2 with the door at right angle to the frame and showing progressive steps of assembly; and FIG. 8 illustrates the hinges reversed with the spherical hinge at the bottom.

FIG. 1 shows a vehicle cab 1 including a door 2. The door 2 includes a side panel 3 and window pane 4. A casement for the window includes a upright support 5 which is hinged to the pillar 6 on the vehicle cab. A roof 7 is also utilized in forming one of the hinges for supporting the door.

The upright support 5 includes cross-plates 8 and 9 which extend from the upright 5 to support the shaft 10. The brackets 11 and 12 also provide a support for the sleeve 13 of the upright support 5 on the lower hinge 14.

The ceiling 15 carries the bearings seat 17. The spherical bushing 18 forms a central opening 19 to receive the shaft 10. The spherical bushing 18 is mounted in the bearing sleeves 20 and 21. The bearing sleeves 20 and 21 are bolted on the bearing seat 17 by means of a bolts 22 and 23. The spherical bushing 18 and shaft 10 form the hinge 24 in the upper edge of the door. The hinge 24 is mounted on the ceiling 15 and provides universal movement of the shaft which carries the door.

The lower hinge 14 is carried on the pillar 6 and pivots the door on the axis 25. The pillar 6 carries the bracket 26 which extends outwardly from the panel 27 to support the sleeve 28. The sleeve 28 receives the pin 29 when the hinge is assembled. Pin 29' shows the pin before it is assembled in the lower hinge assembly.

FIG. 8 shows the spherical bushing 40 at the bottom of the door. The sleeve hinge 41 is shown at the top of the door.

The method of assembly of the device will be described in the following paragraphs.

FIGS. 5, 6 and 7 illustrate the method of hanging the cab door on the cab. FIG. 5 illustrates the door raised for assembly with the spherical bushing 18 with the shaft 10 pointed in the direction of the bushing. The door is then raised and the shaft 10 inserted in the opening 19 as shown in FIG. 6. Since the spherical bushing can rotate within the socket, the door is then pivoted downwardly as shown in FIG. 7 and the pin 29 is inserted in the complementary sleeves to complete the hanging of the door on the hinges.

FIG. 2 shows the assembled position of the hinges in which the shaft 10 is positioned in a spherical bushing 18 providing universal movement of the shaft 10 in the bushing 18 to compensate for any misalignment of the hinge relative to hinge 14. Hinge 14 is a pivotal hinge in which the door pivots on the axis 25 relative to the support bracket 26 supported on the pillar 6.

The embodiments of the invention in which an exclusive property or privilege is claimed are defined as follows:

1. Self-aligning door hinges for a vehicle comprising, a door pillar, a spherical bushing defining a central opening, a socket mounted on said pillar receiving said spherical bushing for universal movement of said spherical bushing, a door, a shaft connected to said door and extending from said door for reception in said sperical bushing forming a hinge of universal movement between said door and said pillar, first sleeve means mounted on said door pillar, means defining a door supporting surface on said first sleeve means, second sleeve means including a mating door carrying surface mounted on said door, a pin positioned in said first and second sleeve means when aligned thereby providing a hinge between said pillar and door and defining with the spherical bushing hinge the hinge axis on said door.

2. Self-aligning door hinges on a vehicle as set forth in claim 1 including an upper and a lower hinge wherein said upper hinge includes said spherical bushing.

3. Self-aligning door hinges on a vehicle as set forth in claim 1 including an upper and a lower hinge wherein said lower hinge defines a spherical bushing.

4. Self-aligning door hinges on a vehicle as set forth in claim 1 including, support structure for said spherical bushing mounted above said door.

5. Self-aligning door hinges on a vehicle as set forth in claim 1 including, a vehicle cab, means supporting said spherical bushing on the top of said vehicle cab.

6. A method of hanging a door on a vehicle having a spherical bushing hinge and a sleeve bushing hinge having door supporting surfaces thereon comprising the steps of: aligning a shaft on said door for reception in the spherical bushing of the spherical bushing hinge, inserting the shaft into said spherical bushing for assembling the spherical bushing hinge of the vehicle door, tilting the door for aligning the sleeve bushing hinge, inserting a pin in the sleeve bushing hinge and seating the door on the door supporting surfaces after assembling the sleeve bushing hinge of said door.

7. A method of mounting a door on a vehicle having a first hinge with a spherical bushing and a shaft extending from the door forming the first hinge, and a second hinge including sleeve bushings for receiving a pivot pin comprising the following steps, aligning the shaft extending from the door with the spherical bushing in the first hinge, inserting the shaft extending from the door into the spherical bushing to provide a hinge, aligning the sleeves of the second hinge, inserting a pin to form the second hinge thereby defining the hinge axis.

* * * * *